US011528625B2

(12) United States Patent
Aminikashani et al.

(10) Patent No.: US 11,528,625 B2
(45) Date of Patent: Dec. 13, 2022

(54) METHOD FOR DETECTING AN ANTENNA DEFECT IN A MOBILE COMMUNICATION SYSTEM OF A MOTOR VEHICLE

(71) Applicant: GM Global Technology Operations LLC, Detroit, MI (US)

(72) Inventors: Mohammadreza Aminikashani, West Bloomfield, MI (US); Scott T Droste, West Bloomfield, MI (US); David M George, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 16/945,059

(22) Filed: Jul. 31, 2020

(65) Prior Publication Data

US 2022/0038924 A1 Feb. 3, 2022

(51) Int. Cl.
*H04W 4/40* (2018.01)
*H04B 17/309* (2015.01)
*H04W 24/08* (2009.01)
*H01Q 1/32* (2006.01)

(52) U.S. Cl.
CPC .......... *H04W 24/08* (2013.01); *H01Q 1/3275* (2013.01); *H01Q 1/3291* (2013.01); *H04B 17/309* (2015.01); *H04W 4/40* (2018.02)

(58) Field of Classification Search
None
See application file for complete search history.

(56) References Cited

U.S. PATENT DOCUMENTS

| 10,601,461 | B1* | 3/2020 | Eaton | G01S 19/36 |
|---|---|---|---|---|
| 10,623,239 | B1* | 4/2020 | Li | H04W 4/40 |
| 2006/0003773 | A1* | 1/2006 | Miyata | H04W 24/00 455/452.2 |
| 2011/0254677 | A1* | 10/2011 | Sun | B60C 23/0437 340/447 |
| 2015/0023400 | A1* | 1/2015 | Das | H04L 25/03891 375/224 |
| 2016/0087655 | A1* | 3/2016 | Kim | H04W 4/029 455/404.1 |
| 2018/0212667 | A1* | 7/2018 | Chen | H04B 7/08 |
| 2018/0338289 | A1* | 11/2018 | Reial | H04W 52/028 |
| 2019/0044629 | A1* | 2/2019 | Stinnett | H04B 17/318 |
| 2019/0356514 | A1* | 11/2019 | Schrammar | H04B 17/318 |

* cited by examiner

*Primary Examiner* — Duc T Duong
(74) *Attorney, Agent, or Firm* — Vivacqua Crane, PLLC

(57) ABSTRACT

A mobile communication system of a motor vehicle includes a primary antenna. The system further includes a telematics module having a processor and at least one memory including a computer program code. The memory and the computer program code are configured to, with the processor, cause the system to detect a predetermined vehicle event and measure a primary signal quality of the reference signal received at the primary antenna. The memory and the computer program code are configured to, with the processor, cause the system to determine a maximum primary signal quality and compare the maximum primary signal quality with a threshold. The memory and the computer program code are configured to, with the processor, cause the system to determine a defect in the primary antenna and activate a diagnostic trouble code associated with the defect, in response to determining that the primary maximum signal quality is below the threshold.

20 Claims, 3 Drawing Sheets

METHOD FOR DETECTING AN ANTENNA DEFECT IN A MOBILE COMMUNICATION SYSTEM OF A MOTOR VEHICLE

INTRODUCTION

The present disclosure relates to cellular-based connected vehicles, and more particularly, to a method for detecting an antenna defect in a mobile communication system of a motor vehicle without requiring a technician to manually inspect the system.

Modern vehicles have "shark-fin" antenna modules that contain multiple antennas and are mounted to a rear end of a vehicle roof. Examples of these antennas include a dedicated short-range communications (DSRC) antenna, AM/FM radio antennas, a satellite radio antenna, a GPS antenna, and two or more MIMO antennas that provide 4G LTE cellular communications. The location of the module on the vehicle roof can affect received signal quality when, for example, the signal is weak and the vehicle is located in a rich scattering environment. However, because these modules are mounted to an exterior structure of the vehicle, it is possible that these modules can be damaged in an accident, act of vandalism, or an attempted theft. Current methods for precisely diagnosing antenna defects in mobile communication systems can require an owner to bring the vehicle to a dealership or repair shop where a technician can disassemble and manually inspect the system.

Thus, while existing mobile communication systems achieve their intended purpose, there is a need for a new and improved method for detecting a defect in a mobile communication system that addresses these issues.

SUMMARY

According to several aspects, a mobile communication system of a motor vehicle includes a primary antenna for receiving a reference signal. The system further includes a telematics module having a processor and at least one memory including a computer program code. The memory and the computer program code are configured to, with the processor, cause the system to detect a predetermined vehicle event. The memory and the computer program code are configured to, with the processor, cause the system to measure a primary signal quality of the reference signal received at the primary antenna and determine a maximum primary signal quality. The memory and the computer program code are configured to, with the processor, cause the system to compare the maximum primary signal quality with a threshold. The system determines a defect in the primary antenna and activates a diagnostic trouble code associated with the defect, in response to determining that the primary maximum signal quality is below the threshold.

In one aspect, the system further includes a secondary antenna for receiving the reference signal, with the secondary antenna positioned within the enclosure of the vehicle. The memory and the computer program code are configured to, with the processor, cause the system to measure a secondary signal quality of the reference signal received at the secondary antenna and determine a maximum secondary signal quality. The memory and the computer program code are configured to, with the processor, cause the system to define that the threshold comprises the maximum secondary signal quality.

In another aspect, the memory and the computer program code are further configured to, with the processor, cause the system to initialize a failure counter for tracking a count of defects. The memory and the computer program code are further configured to, with the processor, cause the system to increase the count of defects by one increment and compare the count of defects to a minimum failure count. The maximum primary signal quality is measured at least in response to determining that the count of defects is below the minimum failure count.

In another aspect, the memory and the computer program code are further configured to, with the processor, cause the system to detect a diagnostic trouble code associated with the defect, with the diagnostic trouble code having an activated status or a deactivated status. The memory and the computer program code are further configured to, with the processor, cause the system to detect that the primary antenna has an enabled status or a disabled status. The system enables the primary antenna, in response to detecting that the primary antenna has the disabled status. The failure counter is initialized in response to the primary antenna being enabled.

In another aspect, the memory and the computer program code are further configured to, with the processor, cause the system to disable the primary antenna, in response to activating the diagnostic trouble code associated with the defect.

In another aspect, the predetermined vehicle event is an ignition "ON" mode of the vehicle, a park gear selection, or an idle engine mode.

In another aspect, a plurality of the primary antennas receive the reference signal. The memory and the computer program code are further configured to, with the processor, cause the system to measure the primary signal quality of the reference signal received at each of the primary antennas and determine the maximum primary signal quality for an associated one of the primary antennas. The memory and the computer program code are further configured to, with the processor, cause the system to compare the maximum primary signal quality for each of the primary antennas with a threshold. The system determines the defect in the primary antennas and activates the diagnostic trouble code associated with the defect, in response to determining that the primary maximum signal quality for the associated primary antenna is below the threshold.

In another aspect, the system further includes a plurality of the secondary antennas receiving the reference signal. The memory and the computer program code are further configured to, with the processor, cause the system to measure the secondary signal quality of the reference signal received at each of the secondary antennas and determine the maximum secondary signal quality for each one of the associated secondary antennas. The system defines that the threshold is a highest one of the maximum secondary signal qualities.

In another aspect, a portion of the primary antennas and a portion of the secondary antennas concurrently receive the reference signal and communicate a data signal between a cellular network and the processor when another portion of the primary antennas and another portion of the secondary antennas are disabled. The data signal is separate from the reference signal.

In another aspect, all the primary antennas and all the secondary antennas concurrently receive the reference signal.

In another aspect, the memory and the computer program code are further configured to, with the processor, cause the system to take a minimum number of measurements of the primary signal quality In another aspect, the memory and the computer program code are further configured to, with the processor, cause the system to initialize a sample counter for tracking a count of measurements, in response to at least initializing the failure check counter. The memory and the computer program code are further configured to, with the processor, cause the system to measure the primary signal quality and determine the maximum primary signal quality. The memory and the computer program code are further configured to, with the processor, cause the system to increase the count of measurements by one increment and compare the count of measurements to a minimum measurement count. The primary signal quality is measured, at least in response to determining that the count of measurement is below the minimum measurement count. The maximum primary signal quality is compared with the threshold, in response to determining that the count of measurement is equal to the minimum measurement count.

According to several aspects, a method for detecting a defect in a mobile communication system of a motor vehicle is provided. The system includes a telematics module having a processor and at least one memory including a computer program code. A primary antenna receives a reference signal, with the primary antenna being mounted to a vehicle roof. The system detects a predetermined vehicle event, measures a primary signal quality of the reference signal received at the primary antenna, and determines a maximum primary signal quality. The system compares the maximum primary signal quality with a threshold, determines a defect in the primary antenna, and activates a diagnostic trouble code associated with the defect, in response to determining that the primary maximum signal quality is below the threshold.

In one aspect, a secondary antenna receives the reference signal. The system measures a secondary signal quality of the reference signal received at the secondary antenna and determine a maximum secondary signal quality. The system defines that the threshold is equal to the maximum secondary signal quality.

In another aspect, the system initializes a failure counter and increases the count of defects by one increment, in response to determining the defect. The system compares the count of defects to a minimum failure count. The defect is determined in further response to determining that the count of defects is equal to the minimum failure count. The system measures the primary signal quality of the reference signal received at each of the primary antennas and determines the maximum primary signal quality for an associated one of the primary antennas, in response to determining that the count of defects is below the minimum failure count. The system compares the maximum primary signal quality for each of the primary antennas with a threshold. The system determines the defect in the primary antennas and activates the diagnostic trouble code associated with the defect, in response to determining that the primary maximum signal quality for the associated primary antenna is below the threshold.

In another aspect, a plurality of the secondary antennas receives the reference signal. The system measures the secondary signal quality of the reference signal received at each of the secondary antennas and determines the maximum secondary signal quality for each of the associated secondary antennas. The system defines that the threshold is equal to the highest one of the maximum secondary signal qualities.

In another aspect, a portion of the primary antennas and a portion of the secondary antennas concurrently receive the reference signal and communicate a data signal between a cellular network and the processor when another portion of the primary antennas and another portion of the secondary antennas are disabled. The data signal is separate from the reference signal.

In another aspect, the system initializes a sample counter for tracking a count of measurements. The system measures the primary signal quality and determines the maximum primary signal quality. The system increases the count of measurements by one increment and compares the count of measurements to a minimum measurement count. The primary signal quality is measured, at least in response to determining that the count of measurement is below the minimum measurement count. The maximum primary signal quality is compared with the threshold, in response to determining that the count of measurements is equal to the minimum measurement count.

According to several aspects, a method for detecting a defect in a mobile communication system of a motor vehicle having an exterior structure and an enclosure is provided. The system includes a primary antenna mounted to the exterior structure, a secondary antenna positioned within the enclosure, and a telematics module positioned in the enclosure. The telematics module has a processor and at least one memory including a computer program code. The system detects a diagnostic trouble code associated with the defect of the primary antenna, and the diagnostic trouble code has an activated status or a deactivated status. The system detects that the primary antenna has an enabled status or a disabled status, in response to detecting the activated status for the diagnostic trouble code. The system enables the primary antenna, in response to detecting that the primary antenna has the disabled status. The system initializes a failure counter, in response to the primary antenna being enabled. The primary antenna and the secondary antenna receive a reference signal. The system detects a predetermined vehicle event, which is an ignition "ON" mode of the vehicle, a park gear selection, an idle engine mode, or an ignition "OFF" mode of the vehicle. The system determines a primary maximum signal quality of the reference signal received at the primary antenna and a secondary maximum signal quality of the reference signal received at the secondary antenna, in response to detecting the predetermined vehicle event. The memory and the computer program code, with the processor, compare the primary maximum signal quality a threshold. The system defines threshold as being equal to a sum of the secondary maximum signal quality and a delta signal quality. The system increases a failure count by one increment. The system determines the defect in the primary antenna and generates a diagnostic trouble code associated with the defect, in response to determining that the primary maximum signal quality is below the threshold. The system resets the failure count, in response to determining that the primary maximum signal quality is equal to or above the threshold. The system disables the primary antenna, in response to determining that the primary maximum signal quality is below the threshold and determining that the failure count is equal to the minimum failure count.

Further areas of applicability will become apparent from the description provided herein. It should be understood that the description and specific examples are intended for purposes of illustration only and are not intended to limit the scope of the present disclosure.

DETAILED DESCRIPTION

Figure 1:
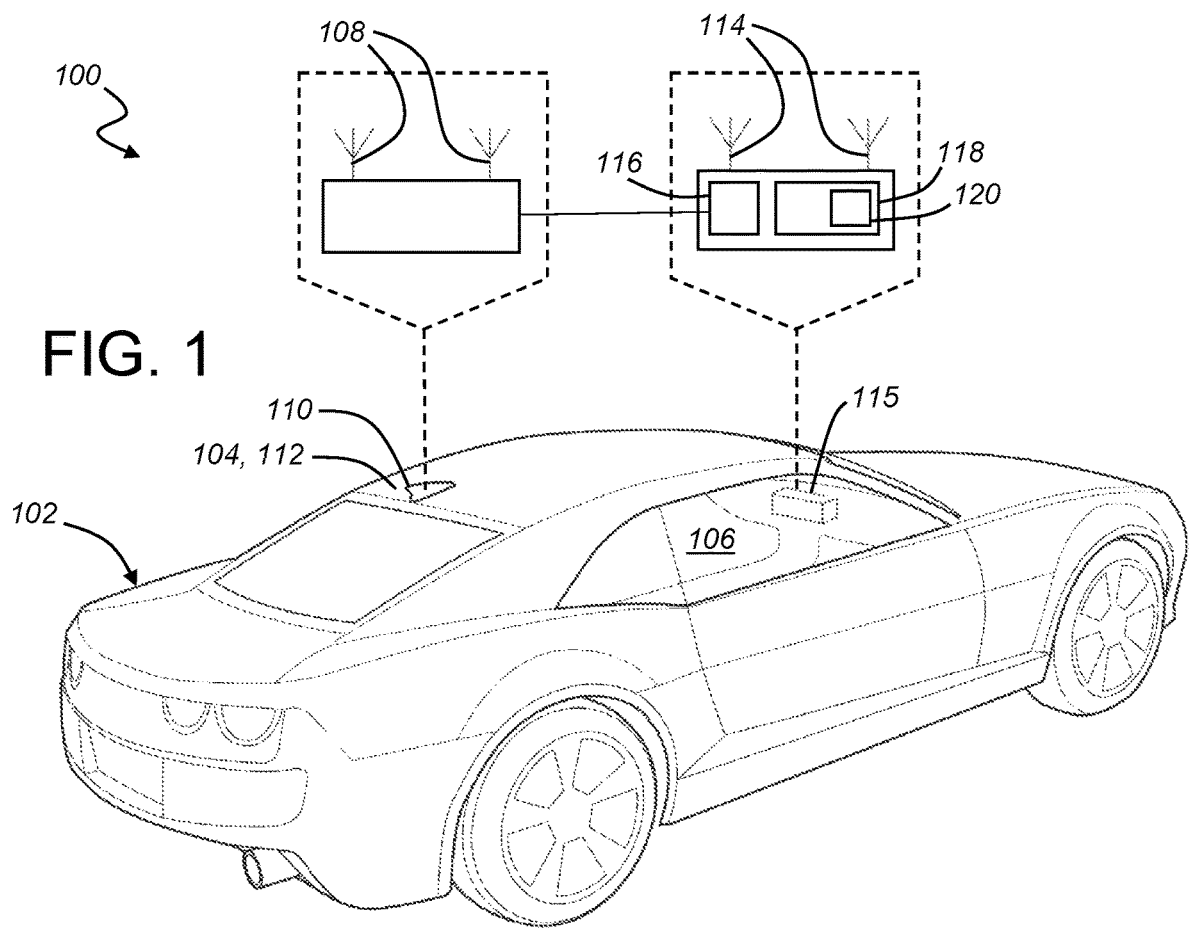
FIG. 1 is a perspective view of one example of a motor vehicle having a mobile communication system.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by reference to the drawings as follows.

Referring to FIG. 1, there is generally shown one example of a mobile communication system 100 of a motor vehicle 102 having an exterior structure 104 and an enclosure 106. While this example of the system includes multiple primary antennas and secondary antennas, other examples of the system can have a single primary antenna or any other suitable number of antennas at any location on the vehicle.

The system 100 includes a plurality of primary antennas 108 for receiving a reference signal, with the primary antennas 108 being mounted to the exterior structure 104 of the vehicle 102. In this example, the primary antennas 108 are contained within a shark-fin antenna module 110 mounted to a rear portion of a vehicle roof 112. However, in other examples, the primary antennas can be mounted to a trunk lid, the sideview mirrors, other exterior structures, or positioned within the enclosure of the vehicle. The system 100 further includes a plurality of secondary antennas 114 for receiving the reference signal, with the secondary antennas 114 being positioned within the enclosure of the vehicle 102. In this example, the secondary antennas 114 are contained within a telematics module 115 disposed within the enclosure. However, in other examples, the secondary antennas can be mounted to any suitable exterior structure of the vehicle. In a full self-diagnostic mode, all the primary antennas and all the secondary antennas communicate a data signal between a cellular network and the system 100 and concurrently receive the reference signal. However, in a partial self-diagnostic mode, it is contemplated that a portion of the primary antennas 108 and a portion of the secondary antennas 114 communicate a data signal between a cellular network and the system 100 and concurrently receive the reference signal when another portion of the primary antennas 108 and another portion of the secondary antennas 114 are disabled. The data signal is separate from the reference signal, such that the system 100 can communicate with the cellular network while testing one portion of the antennas at a time before switching antennas to evaluate the remaining untested ones.

The system 100 further includes a telematics module 115 positioned within the enclosure 106, with the telematics module 115 having the processor 116 and at least one memory 118. The memory is a non-transitory machine-readable storage medium including a computer program code 120. The memory 118 and the computer program code 120 are configured to, with the processor 116, cause the system 100 at least to detect a diagnostic trouble code associated with the defect of the primary antenna 108, with the diagnostic trouble code having an activated status or a deactivated status. The memory 118 and the computer program code 120 are further configured to, with the processor 116, cause the system 100 to detect that the primary antenna 108 has an enabled status or a disabled status, in response to detecting the activated status for the diagnostic trouble code. The memory 118 and the computer program code 120 are further configured to, with the processor 116, cause the system 100 to enable the primary antenna 108, in response to detecting that the primary antenna has the disabled status. The failure counter is initialized in response to enabling the primary antenna 108 or detecting that the primary antenna 108 has the enabled status.

The memory 118 and the computer program code 120 are further configured to, with the processor 116, cause the system 100 to detect a predetermined vehicle event and measure a primary signal quality of the reference signal received at each of the primary antennas 108, in response to detecting the predetermined vehicle event. In this example, the measured signal quality is Reference Signal Received Power ("RSRP"), Received Signal Strength Indicator (RSSI), Reference Signal Received Quality (RSRQ) or Signal to Interference & Noise Ratio (SINR). However, it is contemplated that the signal quality can be any suitable parameter of the reference signal. The predetermined vehicle event is an ignition "ON" mode of the vehicle. In other examples, the predetermined vehicle event can be a park gear selection, an idle engine mode, or any suitable ignition "OFF" mode of the vehicle.

The memory 118 and the computer program code 120 are further configured to, with the processor 116, cause the system 100 to measure a primary signal quality and determine a maximum primary signal quality for an associated one of the primary antennas 108. The memory 118 and the computer program code 120 are further configured to, with the processor 116, cause the system 100 to compare the maximum primary signal quality for each of the primary antennas 108 with a threshold. The memory 118 and the computer program code 120 are further configured to, with the processor 116, cause the system 100 to determine a defect in the associated primary antenna and activate a diagnostic trouble code associated with the defect, in response to determining that the primary maximum signal quality for the associated primary antenna is below the threshold. The memory 118 and the computer program code 120 are further configured to, with the processor 116, cause the system 100 to disable the primary antenna 108, in response to activating the diagnostic trouble code associated with the defect.

The memory 118 and the computer program code 120 are further configured to, with the processor 116, cause the system 100 to measure a secondary signal quality of the reference signal received at each of the secondary antennas 114. The memory 118 and the computer program code 120 are further configured to, with the processor 116, cause the system 100 measure a secondary signal quality determine a maximum secondary signal quality for each of the associated secondary antennas 114. The memory 118 and the computer program code 120 are further configured to, with the processor 116, cause the system 100 to define the threshold as the highest one of the maximum secondary signal qualities, such that the primary maximum signal quality for each primary antenna is compared to the highest maximum secondary signal quality.

The memory 118 and the computer program code 120 are further configured to, with the processor 116, cause the system 100 to initialize a failure counter for tracking a count of defects. The memory 118 and the computer program code 120 are further configured to, with the processor 116, cause the system 100 to increase the count of defects by one increment, in response to determining the defect. The memory 118 and the computer program code 120 are further configured to, with the processor 116, cause the system 100 to compare the count of defects to a minimum failure count. The maximum primary signal quality can be measured, at least in response to determining that the count of defects is below the minimum failure count.

While this system 100 is configured to simultaneously test all primary antennas at one time, the system 100 is also configured to test one primary antenna at a time while the other primary antenna is disabled and then switching antennas such that the former becomes disabled and the latter receives the reference signal. The memory 118 and the computer program code 120 are further configured to, with the processor 116, cause the system 100 to measure the primary signal quality for one primary antenna a minimum number of times before determining a maximum signal quality and comparing the maximum signal quality with a threshold. More specifically, the memory 118 and the computer program code 120 are further configured to, with the processor 116, cause the system 100 to initialize a sample counter for tracking a count of measurements. The memory 118 and the computer program code 120 are further configured to, with the processor 116, cause the system 100 to measure the primary signal quality, in response to at least initializing the sample counter. The memory 118 and the computer program code 120 are further configured to, with the processor 116, cause the system 100 to measure the primary signal quality and determine the maximum primary signal quality for the primary antenna 108. The memory 118 and the computer program code 120 are further configured to, with the processor 116, cause the system 100 to increase the count of measurements by one increment, in response to determining the maximum primary signal quality. The memory 118 and the computer program code 120 are further configured to, with the processor 116, cause the system 100 to compare the count of measurements to a minimum measurement count. The primary signal quality is measured at least in response to determining that the count of measurement is below the minimum measurement count. The maximum primary signal quality is compared with the threshold, in response to determining that the count of measurement is equal to the minimum measurement count.

Figure 2:
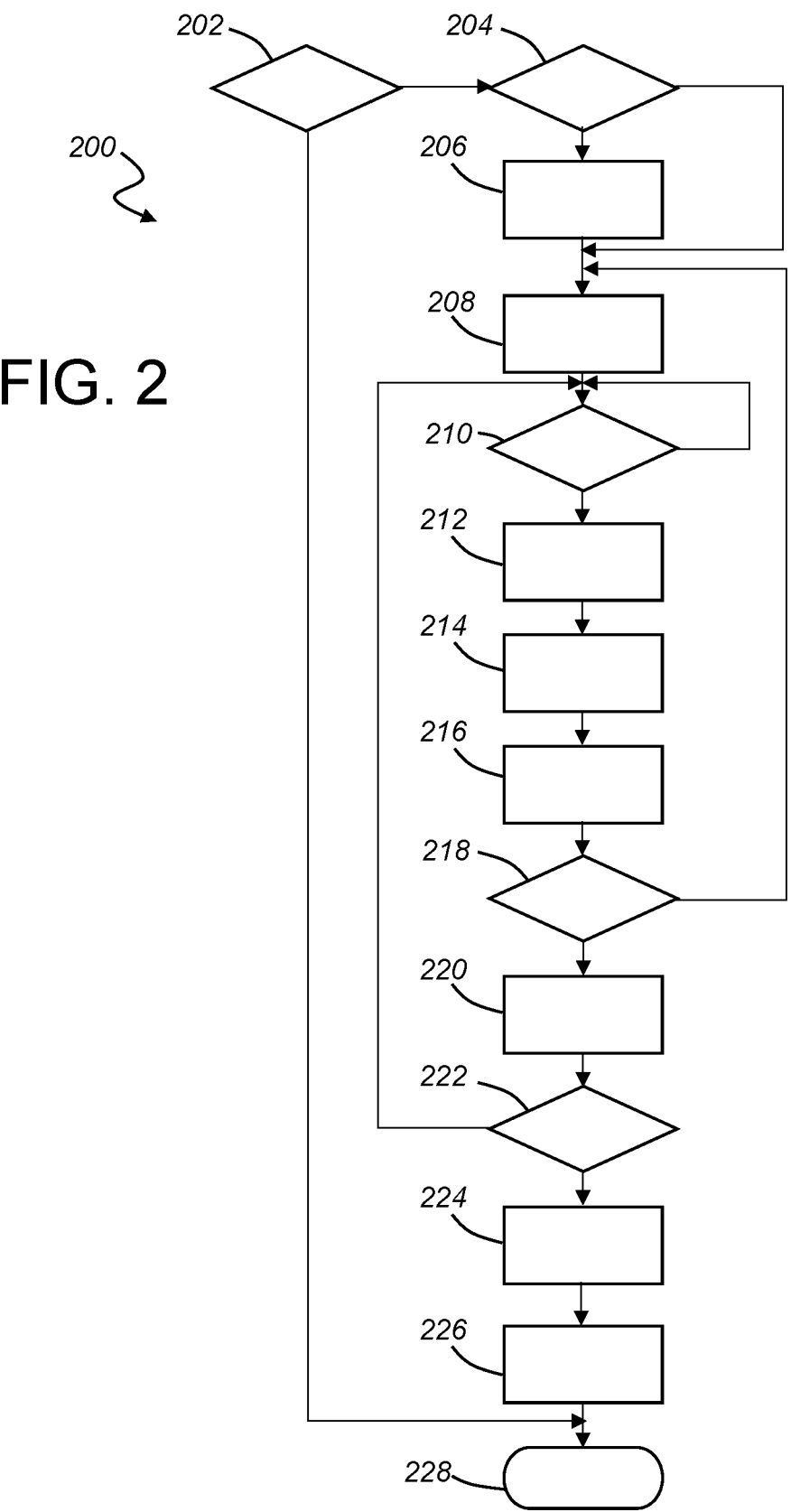
FIG. 2 is a flow chart of one example of a method for operating the mobile communication system of FIG. 1.

Referring to FIG. 2, a flowchart for one example of a method 200 for detecting a defect in the mobile communication system 100 of FIG. 1 is illustrated. The method begins at block 202 where the memory 118 and the computer program code 120, with the processor 116, cause the system 100 to detect a diagnostic trouble code associated with defects in the primary antennas 108, with the diagnostic trouble code having an activated status or a deactivated status. If the system 100 detects the deactivated status for an antenna, the method proceeds to block 204 for the associated antenna. If the system 100 detects the activated status for an antenna, the method proceeds to the end 228 for the associated antenna.

At block 204, the memory 118 and the computer program code 120, with the processor 116, cause the system 100 to detect that the primary antenna 108 has an enabled status or a disabled status. If the system 100 detects the disabled status, the method proceeds to block 206. If the system 100 detects the enabled status, the method proceeds immediately to block 208.

At block 206, the memory 118 and the computer program code 120, with the processor 116, cause the system 100 to enable the primary antenna 108.

At block 208, the memory 118 and the computer program code 120, with the processor 116, cause the system 100 to initialize the failure counter.

At block 210, the memory 118 and the computer program code 120, with the processor 116, detects whether the predetermined vehicle event has occurred. The predetermined vehicle event is an ignition "ON" mode of the vehicle when, for example, the key is turned to the "ON" position. In other examples, the predetermined vehicle event can be a park gear selection, an idle engine mode, or any suitable ignition "OFF" mode of the vehicle. If the system 100 detects that the predetermined vehicle event has occurred, the method proceeds to block 212. If the system 100 does not detect that the predetermined vehicle event has occurred, the method repeats block 210.

At block 212, the primary and secondary antennas 108, 114 receive the reference signal. In this example, all of the primary and secondary antennas 108, 114 receive the reference signal. In another example, a portion of the primary antennas and a portion of the secondary antennas communicate a data signal between the cellular network and the system 100 and currently receive the reference signal while another portion of the primary antennas and another portion of the secondary antennas are disabled.

At block 214, the memory 118 and the computer program code 120, with the processor 116, cause the system 100 to measure the primary signal quality of the reference signal received at each of the primary antennas 108 and the secondary signal quality of the reference signal received at each of the secondary antennas 114.

At block 216, the memory 118 and the computer program code 120, with the processor 116, cause the system 100 to determine a maximum primary signal quality for each of the associated primary antennas 108. In addition, the memory 118 and the computer program code 120, with the processor 116, also cause the system 100 to determine a maximum secondary signal quality for each of the associated secondary antennas 114.

At block 218, the memory 118 and the computer program code 120, with the processor 116, cause the system 100 to compare the maximum primary signal quality of each of the primary antennas 108 with the threshold. The memory 118 and the computer program code 120, with the processor 116, cause the system 100 to define that the threshold is equal to the highest one of the maximum secondary signal qualities. In other examples, the threshold is the threshold is the highest one of the maximum secondary signal qualities plus a predetermined delta signal quality. If the system 100 determines that the primary maximum signal quality for any of the primary antennas 108 is equal to or above the threshold, the method returns to block 208 for the associated primary antennas. If the system 100 determines that the primary maximum signal quality for any of the primary antennas 108 is below the threshold, the method proceeds to block 220 for the associated antennas.

At block 220, the memory 118 and the computer program code 120, with the processor 116, cause the system 100 to increase the count of defects by one increment for the associated primary antennas having the defect.

At block 222, the memory 118 and the computer program code 120, with the processor 116, cause the system 100 to compare the count of defects to a minimum failure count. If the system 100 determines that the count of defects is below the minimum failure count, the method returns to block 210.

If the system 100 determines that the count of defects is equal to the minimum failure count for the associated antenna, the method proceeds to block 224.

At block 224, the memory 118 and the computer program code 120, with the processor 116, cause the system 100 to determine the defect in the associated primary antenna and activates the diagnostic trouble code for a defect in the associated antenna.

At block 226, the memory 118 and the computer program code 120, with the processor 116, cause the system 100 to disable the primary antenna having the associated defect. In this example where all antennas have been tested, the method proceeds to block 228 where the method terminates. In other examples, where the method tested a portion of the antennas while the remaining antennas were disabled, the method returns to block 302 to enable and test the remaining untested antennas.

Figure 3:
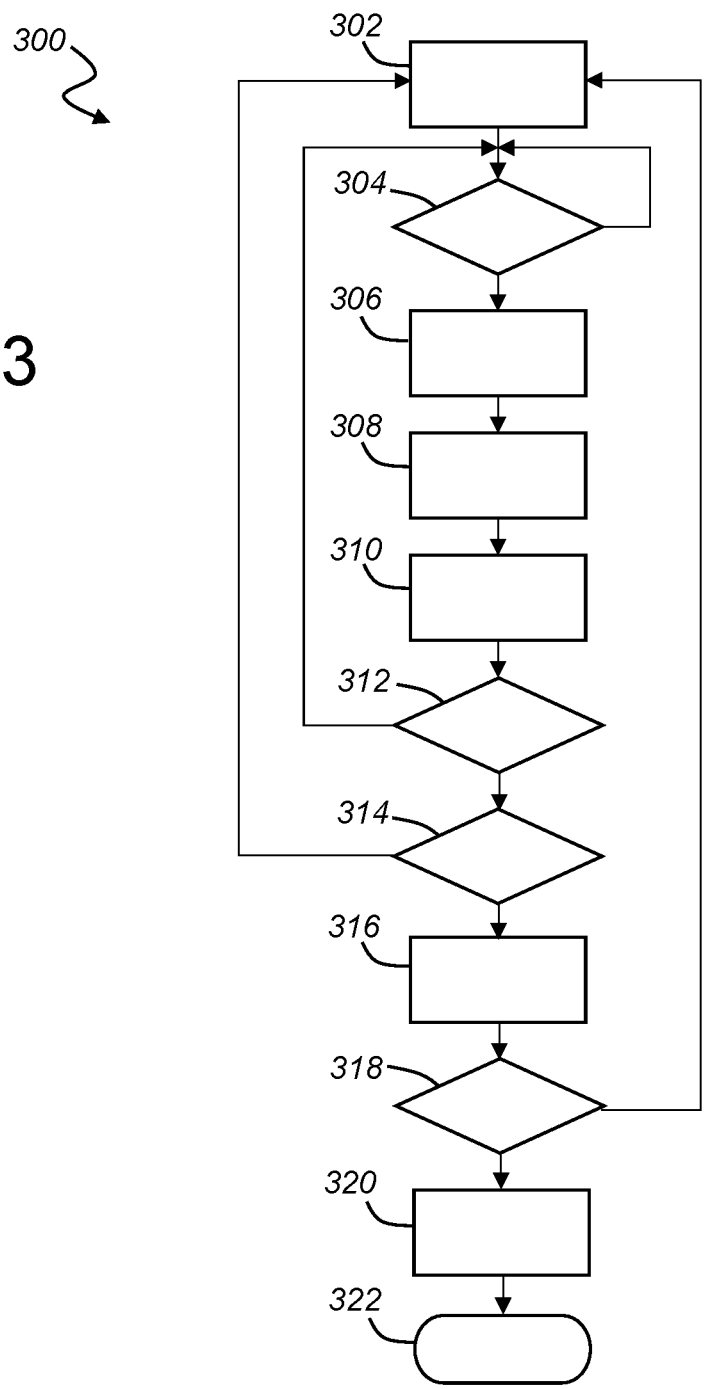
FIG. 3 is a flow chart of another example of a method for operating the mobile communication system of FIG. 1.

Referring to FIG. 3, a flowchart for another example of a method 300 for detecting a defect in the mobile communication system 100 of FIG. 1 is shown, with the method for detecting a defect in a single antenna at one time after taking a minimum number of signal quality measurements. The method 300 begins at block 302 with the memory 118 and the computer program code 120, with the processor 116, causing the system 100 to initialize a sample counter for tracking a count of measurements.

At block 304, the memory 118 and the computer program code 120, with the processor 116, cause the system 100 to detect whether the predetermined vehicle event has occurred. The predetermined vehicle event is an ignition "ON" mode of the vehicle. In other examples, the predetermined vehicle event can be a park gear selection, an idle engine mode, or any suitable ignition "OFF" mode of the vehicle. If the system 100 detects the predetermined vehicle event, the method 300 proceeds to block 306. If the system 100 does not detect the predetermined vehicle event, the method repeats block 304.

At block 306, the memory 118 and the computer program code 120, with the processor 116, cause the system 100 to measure the current primary signal quality of the primary antenna 108.

At block 308, the memory 118 and the computer program code 120, with the processor 116, cause the system 100 to determine the maximum primary signal quality.

At block 310, the memory 118 and the computer program code 120, with the processor 116, cause the system 100 to increase the count of measurements by one increment.

At block 312, the memory 118 and the computer program code 120, with the processor 116, cause the system 100 to compare the count of measurements to a minimum measurement count. If the system 100 determines that the count of measurements is below the minimum measurement count, the method 300 returns to block 304. If the system 100 determines that the count of measurement is equal to the minimum measurement count, the method 300 proceeds to block 314.

At block 314, the memory 118 and the computer program code 120, with the processor 116, cause the system 100 to compare the maximum primary signal quality to the threshold, which in this example is a predetermined threshold. If the maximum primary signal quality is equal to or greater than the predetermined threshold, the method returns to block 302 where the memory 118 and the computer program code 120, with the processor 116, cause the system 100 to reset the count of measurements. If the maximum primary signal quality is below the predetermined threshold, the method proceeds to block 316.

At block 316, the memory 118 and the computer program code 120, with the processor 116, cause the system 100 to start switching between the primary and secondary antennas in ignition "ON" mode or ignition "OFF" mode and collecting signal quality measurements over a period of time or for a predetermined number of samples.

At block 318, the system compares the maximum primary signal quality of the primary antennas with the secondary maximum signal quality of the secondary antennas. If the maximum primary signal quality of the primary antennas is less than the secondary maximum signal quality of the secondary antennas, the method proceeds to block 320. If the maximum primary signal quality of the primary antennas is equal to or greater than the secondary maximum signal quality of the secondary antennas, the method returns to block 302.

At block 320, the system determines the defect in the primary antenna, activates the diagnostic trouble code for a defect in the primary antenna 108, and disables the primary antenna 108 having the defect. Thereafter, the method can return to block 302 to test previously untested antennas or terminate at block 322.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A mobile communication system of a motor vehicle, the mobile communication system comprising:
   a primary antenna for receiving a reference signal;
   a telematics module having a processor and at least one memory including a computer program code, the at least one memory and the computer program code being configured to, with the processor, cause the system at least to:
   detect a predetermined vehicle event;
   measure a primary signal quality of the reference signal received at the primary antenna in response to detecting the predetermined vehicle event;
   determine a maximum primary signal quality in response to measuring the primary signal quality;
   compare the maximum primary signal quality with a threshold; and
   determine a defect in the primary antenna and activate a diagnostic trouble code associated with the defect, in response to determining that the primary maximum signal quality is below the threshold.

2. The mobile communication system of claim 1 further comprising:
   a secondary antenna for receiving the reference signal, with the secondary antenna positioned within an enclosure of the motor vehicle;
   wherein the at least one memory and the computer program code are configured to, with the processor, cause the system at least to:
   measure a secondary signal quality of the reference signal received at the secondary antenna;
   determine a maximum secondary signal quality in response to measuring the secondary signal quality; and
   define that the threshold comprises the maximum secondary signal quality.

3. The mobile communication system of claim 2 wherein the at least one memory and the computer program code are configured to, with the processor, cause the system at least to:
  initialize a failure counter for tracking a count of defects;
  increase the count of defects by one increment in response to determining the defect; and
  compare the count of defects to a minimum failure count;
  wherein measuring the maximum primary signal quality is at least in response to determining that the count of defects is below the minimum failure count.

4. The mobile communication system of claim 3 further comprises the at least one memory and the computer program code being configured to, with the processor, cause the mobile communication system at least to:
  detect a diagnostic trouble code associated with the defect of the primary antenna, with the diagnostic trouble code having one of an activated status and a deactivated status;
  detect that the primary antenna has one of an enabled status and a disabled status in response to detecting the activated status for the diagnostic trouble code; and
  enable the primary antenna in response to detecting that the primary antenna has the disabled status;
  wherein initializing the failure counter is in response to one of enabling the primary antenna and detecting that the primary antenna has the enabled status.

5. The mobile communication system of claim 3 further comprises the at least one memory and the computer program code being configured to, with the processor, cause the mobile communication system at least to:
  disable the primary antenna in response to activating the diagnostic trouble code associated with the defect.

6. The mobile communication system of claim 5 wherein the predetermined vehicle event is one of an ignition "ON" mode of the motor vehicle, a park gear selection, and an idle engine mode.

7. The mobile communication system of claim 2 further comprises:
  a plurality of the primary antennas receiving the reference signal;
  wherein the at least one memory and the computer program code are configured to, with the processor, cause the mobile communication system at least to:
    measure the primary signal quality of the reference signal received at each of the primary antennas in response to detecting the predetermined vehicle event;
    determine the maximum primary signal quality for an associated one of the primary antennas in response to measuring the primary signal quality;
    compare the maximum primary signal quality for each of the primary antennas with a threshold; and
    determine the defect in the primary antennas and activate the diagnostic trouble code associated with the defect, in response to determining that the primary maximum signal quality for the associated primary antenna is below the threshold.

8. The mobile communication system of claim 7 further comprises:
  a plurality of the secondary antennas receiving the reference signal;
  wherein the at least one memory and the computer program code are configured to, with the processor, cause the system at least to:
    measure the secondary signal quality of the reference signal received at each of the secondary antennas;
    determine the maximum secondary signal quality for each one of the associated secondary antennas in response to measuring the secondary signal quality; and
    define that the threshold is a highest one of the maximum secondary signal qualities.

9. The mobile communication system of claim 8 wherein a portion of the primary antennas and a portion of the secondary antennas communicate a data signal between a cellular network and the processor and concurrently receive the reference signal when another portion of the primary antennas and another portion of the secondary antennas are disabled, with the data signal being separate from the reference signal.

10. The mobile communication system of claim 8 wherein all the primary antennas and all the secondary antennas concurrently receive the reference signal.

11. The mobile communication system of claim 1 wherein the at least one memory and the computer program code are configured to, with the processor, cause the mobile communication system at least to measure the primary signal quality a minimum number of times.

12. The mobile communication system of claim 11 wherein the at least one memory and the computer program code are configured to, with the processor, cause the mobile communication system at least to:
  initialize a sample counter for tracking a count of measurements;
  measure the primary signal quality in response to at least initializing a failure-check counter;
  determine the maximum primary signal quality in response to measuring the primary signal quality;
  increase the count of measurements by one increment in response to determining the maximum primary signal quality; and
  compare the count of measurements to a minimum measurement count;
  wherein measuring the primary signal quality is at least in response to determining that the count of measurement is below the minimum measurement count; and
  wherein comparing the maximum primary signal quality with the threshold is in response to determining that the count of measurement is equal to the minimum measurement count.

13. A method for detecting a defect in a mobile communication system of a motor vehicle, the mobile communication system having a telematics module including a processor and at least one memory that has a computer program code, the method comprising:
  receiving, using a primary antenna, a reference signal;
  processing, using the at least one memory and the computer program code with the processor, comprising:
    detecting a predetermined vehicle event;
    measuring a primary signal quality of the reference signal received at the primary antenna in response to detecting the predetermined vehicle event;
    determining a maximum primary signal quality in response to measuring the primary signal quality;
    comparing the maximum primary signal quality with a threshold; and
    determining a defect in the primary antenna and activate a diagnostic trouble code associated with the defect, in response to determining that the primary maximum signal quality is below the threshold.

14. The method of claim 13 further comprising:
  receiving, using a secondary antenna, the reference signal;

processing, using the at least one memory and the computer program code with the processor, comprising:
measuring a secondary signal quality of the reference signal received at the secondary antenna;
determining a maximum secondary signal quality in response to measuring the secondary signal quality; and
defining that the threshold comprises the maximum secondary signal quality.

15. The method of claim 14 wherein the processing further comprises:
initializing a failure counter for tracking a count of defects;
increasing the count of defects by one increment in response to determining the defect; and
comparing the count of defects to a minimum failure count;
wherein measuring the maximum primary signal quality is at least in response to determining that the count of defects is below the minimum failure count; and
wherein determining the defect is in further response to determining that the count of defects is equal to the minimum failure count.

16. The method of claim 15 further comprises:
receiving, using a plurality of the primary antennas, the reference signal;
wherein the processing further comprises:
measuring the primary signal quality of the reference signal received at each of the primary antennas in response to detecting the predetermined vehicle event;
determining the maximum primary signal quality for an associated one of the primary antennas in response to measuring the primary signal quality;
comparing the maximum primary signal quality for each of the primary antennas with a threshold; and
determining the defect in the primary antennas and activating the diagnostic trouble code associated with the defect, in response to determining that the primary maximum signal quality for the associated primary antenna is below the threshold.

17. The method of claim 16 further comprising:
receiving, using a plurality of the secondary antennas, the reference signal;
wherein the processing further comprises:
measuring the secondary signal quality of the reference signal received at each of the secondary antennas;
determining the maximum secondary signal quality for each one of the associated secondary antennas in response to measuring the secondary signal quality; and
defining that the threshold is a highest one of the maximum secondary signal qualities.

18. The method of claim 17 further comprising:
communicating, using a portion of the primary antennas and a portion of the secondary antennas, the reference signal and a data signal between a cellular network and the processor when another portion of the primary antennas and another portion of the secondary antennas are disabled, with the data signal being separate from the reference signal.

19. The method of claim 16 the processing further comprises:
initializing a sample counter for tracking a count of measurements;
measuring the primary signal quality in response to at least initializing the sample counter;
determining the maximum primary signal quality in response to measuring the primary signal quality;
increasing the count of measurements by one increment in response to determining the maximum primary signal quality; and
comparing the count of measurements to a minimum measurement count;
wherein measuring the primary signal quality is at least in response to determining that the count of measurement is below the minimum measurement count; and
wherein comparing the maximum primary signal quality with the threshold is in response to determining that the count of measurements is equal to the minimum measurement count.

20. A method for detecting a defect in a mobile communication system of a motor vehicle having an exterior structure and an enclosure, the mobile communication system including a telematics module positioned in the enclosure, a primary antenna mounted to the exterior structure, and a secondary antenna positioned within the enclosure, with the telematics module having a processor and at least one memory including a computer program code, the method comprising:
detecting a diagnostic trouble code associated with the defect of the primary antenna, with the diagnostic trouble code having one of an activated status and a deactivated status;
detecting that the primary antenna has one of an enabled status and a disabled status in response to detecting the activated status for the diagnostic trouble code;
enabling the primary antenna in response to detecting that the primary antenna has the disabled status;
initializing a failure counter is in response to one of enabling the primary antenna and detecting that the primary antenna has the enabled status;
receiving, using the primary antenna and the secondary antenna, a reference signal;
processing, using the at least one memory and the computer program code with the processor, comprising:
detecting a predetermined vehicle event;
recording a primary maximum signal quality of the reference signal received at the primary antenna in response to detecting the predetermined vehicle event;
recording a secondary maximum signal quality of the reference signal received at the secondary antenna in response to detecting the predetermined vehicle event;
defining a threshold as a sum of the secondary maximum signal quality and a delta signal quality;
comparing the primary maximum signal quality with the threshold;
increasing a failure count by one increment;
determining the defect in the primary antenna in response to determining that the primary maximum signal quality is below the threshold;
generating a diagnostic trouble code associated with the defect in response to determining that the primary maximum signal quality is below the threshold; and
resetting the failure count in response to determining that the primary maximum signal quality is equal to at least the threshold; and
disabling the primary antenna, in response to determining that the primary maximum signal quality is below the threshold and determining that the failure count is equal to the minimum failure count;

wherein the predetermined vehicle event is one of an ignition "ON" mode of the motor vehicle, a park gear selection, and an idle engine mode.

\* \* \* \* \*